(12) United States Patent
Murray et al.

(10) Patent No.: US 11,784,913 B2
(45) Date of Patent: Oct. 10, 2023

(54) METHODOLOGY FOR EFFICIENT UPSTREAM MULTICAST IN PON NETWORKS

(71) Applicant: TELLABS ENTERPRISES, INC., Dallas, TX (US)

(72) Inventors: Leslie Robert Murray, The Colony, TX (US); James J. Gainer, Decatur, TX (US); Thomas Ray Dobozy, Frisco, TX (US)

(73) Assignee: TELLABS ENTERPRISE, INC., Dallas, TX (US)

( * ) Notice: Subject to any disclaimer, the term of this patent is extended or adjusted under 35 U.S.C. 154(b) by 131 days.

(21) Appl. No.: 17/178,902

(22) Filed: Feb. 18, 2021

(65) Prior Publication Data

US 2021/0288900 A1 Sep. 16, 2021

Related U.S. Application Data

(63) Continuation of application No. 16/289,465, filed on Feb. 28, 2019, now Pat. No. 10,958,565.

(60) Provisional application No. 62/636,650, filed on Feb. 28, 2018.

(51) Int. Cl.
| | |
|---|---|
| *H04L 12/28* | (2006.01) |
| *H04L 45/16* | (2022.01) |
| *H04L 12/18* | (2006.01) |
| *H04L 49/201* | (2022.01) |

(52) U.S. Cl.
CPC .............. *H04L 45/16* (2013.01); *H04L 12/185* (2013.01); *H04L 12/2898* (2013.01); *H04L 49/201* (2013.01)

(58) Field of Classification Search
None
See application file for complete search history.

(56) References Cited

U.S. PATENT DOCUMENTS

| | | | | |
|---|---|---|---|---|
| 7,684,403 B2 * | 3/2010 | Kim | .................... | H04Q 11/0071 370/216 |
| 2003/0117998 A1 * | 6/2003 | Sala | .................... | H04Q 11/0067 370/392 |
| 2009/0067840 A1 * | 3/2009 | Bernard | .............. | H04J 14/0247 398/67 |
| 2012/0218998 A1 * | 8/2012 | Sarikaya | ............... | H04L 69/167 370/390 |
| 2013/0315594 A1 * | 11/2013 | Liang | ..................... | H04B 10/27 398/66 |

* cited by examiner

*Primary Examiner* — Abdelillah Elmejjarmi
(74) *Attorney, Agent, or Firm* — Alexander B. Uber; Gray Reed

(57) ABSTRACT

Systems and methods for efficient upstream multicast in passive optical networks. An upstream multicast source communicates an upstream multicast packet to the network. Subsequent downstream packet management achieved through use of source filters prevents a reflected copy of the original upstream multicast packets from being received by the upstream multicast source.

17 Claims, 5 Drawing Sheets

PRIOR ART

METHODOLOGY FOR EFFICIENT UPSTREAM MULTICAST IN PON NETWORKS

CITATION TO PRIOR APPLICATIONS

The present application is a Continuation of Non Provisional U.S. patent application Ser. No. 16/289,465, entitled "METHODOLOGY FOR EFFICIENT UPSTREAM MULTICAST IN PON NETWORKS" and filed Feb. 28, 2019, which claims priority for purposes of this application to U.S. Provisional Application Ser. No. 62/636,650, entitled "METHODOLOGY FOR EFFICIENT UPSTREAM MULTICAST IN PON NETWORKS" and filed Feb. 28, 2018.

BACKGROUND OF THE INVENTION

1. Field of the Invention

The present invention is directed to methods and systems for efficient upstream multicast in passive optical networks (PON).

2. Terminology

For reference, the following acronyms and corresponding explanations are provided:

GEM—A GPON Encapsulation Method (GEM) port is a virtual port for performing GEM encapsulation for transmitting frames between the OLT and the ONU/ONT.

IGMP—The Internet Group Management Protocol (IGMP) is a communications protocol used by hosts and adjacent routers on IPv4 networks to establish multicast group memberships. IGMP is an integral part of IP multicast.

NNI—Network to Network interfaces. These are the interfaces on the OLT that typically connect upstream to the aggregation of core networks.

PON—Passive Optical Network. A PON is a telecommunications network that transmits data over fiber optic lines. It is "passive" since it uses unpowered splitters to route data sent from a central location to multiple destinations. The PON connects the OLT PON port to up to 64 ONTs in a typical deployed network.

OLT—Optical Line Terminal, terminates PON interfaces and NNI interfaces and bridges packets between users on PON and NNI interfaces.

ONT—Optical Network Terminal. ONTs are connected to the OLT via the PON via a splitter. ONTs take traffic to/from ONT UNI ports and transfer it to/from the PON.

UNI—User Network Interface. Ethernet Interfaces on ONTs are typically referred to as UNIs.

VLANs—A virtual LAN (VLAN) is any broadcast domain that is partitioned and isolated in a computer network at the data link layer (OSI layer 2).

3. Description of the Prior Art

Prior art PONs are often designed to prioritize downstream multicast from NNIs on an OLT to UNIs on an ONT.

These PONs have been traditionally used for residential broadband services delivery. All content in such prior art systems was delivered from the service provider headend networks down to the customer. Service providers presently use multicast to deliver the IPTV service to their customers though current standards (as reflected in the implementation of all current telecommunication networks) only feature multicast in the downstream direction.

Accordingly, prior art techniques and hardware are directed to maximizing the efficiency of downstream multicast. This is accomplished by using a shared multicast downstream GEM port that is broadcast to all ONTs. ONTs listen to multicast groups of interest and forward to listeners that have joined the relevant multicast group. Upstream multicast is not prioritized in these systems.

When a system is setup for IPTV, the prior art implementation of downstream-focused multicast is the most efficient mechanism for multicast forwarding as it uses a single multicast GEM port to send all downstream multicast. All ONTs listen to this same GEM port in order to effect substantially simultaneous reception of the stream. Within the ONTs, the multicast is distributed to other ports based on IGMP join messages. The efficiency stems from only one copy of a packet being sent down the PON port to be later forwarded and/or replicated within the ONT as needed. This minimizes the amount of multicast traffic on the PON and greatly increases the efficiency of multicast transmission.

In the telecommunications market, all multicast sources are at the uplink of the OLT, and therefore in the downstream direction, making this design very effective.

By contrast, enterprise applications of PONs require support for symmetric upstream/downstream behavior that is substantially equivalent to that of enterprise switches. For example, multicast sources may be at ONT ports and need to send multicast upstream. The downstream-focused prior art design is insufficient to satisfy that need.

Although the prior art includes some systems that support upstream multicast in PONs, these designs rely on the system's ability to replicate traffic on the PON into unicast GEM ports. This requires replicating traffic to each destination on the PON that has the same VLAN assigned to an ONT UNI. It also needs to be forwarded to the UNI. For example, if 128 ports are listening to a VLAN, then the multicast packet is replicated 127 times. The packet is not replicated for sending back to the source port of the upstream unicast packet. In essence, this process results in the possibility that packets waiting at the OLT be delayed by 127 packet transmission times. Furthermore, considerable PON bandwidth is wasted and jitter is increased. PTP, voice, and other timing sensitive services on the PON may suffer in a system that implements the prior art approach to upstream multicast.

Attempts to take advantage of a multicast GEM port described in downstream-focused systems to achieve effective upstream multicast have not yielded satisfactory results. This is because, as discussed above, a multicast GEM port is a special GEM port which is listened to by all ONTs on the PON. This allows for efficient downstream broadcasting of any packet needing this service. Again, the typical downstream multicast method involves: multicast packets being placed on the multicast GEM port, ONTs on the PON receiving those packets, the ONTs then employing a filter to listen to only those multicast groups to which its UNIs have joined, and the ONTs forwarding the packets to those UNIs.

The same approach cannot be used for upstream multicast because the source port will get a "reflected" copy of the packet. This occurs because the upstream source UNI port must first join a multicast group to send a packet upstream. Once the packet goes up the PON and reaches the OLT, the OLT will forward the packet to the NNI and also "reflect" that packet to any PONs which are listening to that same multicast group. Only one copy of the packet goes down to the multicast GEM port. When the packet reaches the ONT, any ports that have joined the multicast group (including the source UNI port) will get a copy of the packet.

As many applications that rely on these packets do not block packets with their own source address, confusion may occur when a reflected packet is received and cause the system to fail. In particular, applications receiving a reflected packet will fall into a loop when trying to answer their own messages. The present invention resolves this problem and allows for efficient upstream multicast utilizing a multicast GEM port.

SUMMARY OF THE INVENTION

It is an object of the present invention to provide for efficient upstream multicasting in a PON through utilization of a multicast GEM port.

The upstream multicasting methodology of the present invention addresses the above-referenced problems, limitations, and unmet desires experienced with prior art approaches.

In certain embodiments, the present invention incorporates a filtering mechanism to prevent upstream sources from seeing their own packets reflected back in subsequent downstream communications.

DETAILED DESCRIPTION OF THE INVENTION

This description, with reference to the figures, presents non-limiting examples of embodiments of the present invention.

As will be appreciated by those skilled in the art, a conventional multicast PON system is comprised of at least one OLT and a plurality of ONTs. The OLT typically comprises at least one NNI and at least one GEM port. Each ONT of said plurality of ONTs typically comprises at least one UNI and at least one GEM port.

In one embodiment of the present invention, each ONT of a plurality of ONTs shares a multicast GEM port with the other ONTs of said plurality. This shared multicast GEM port is utilized for all upstream multicast traffic.

To address the concerns with traditional systems, in certain embodiments, a filter is implemented to ensure no receipt of "reflected" packets by an upstream source port.

Figure 1:
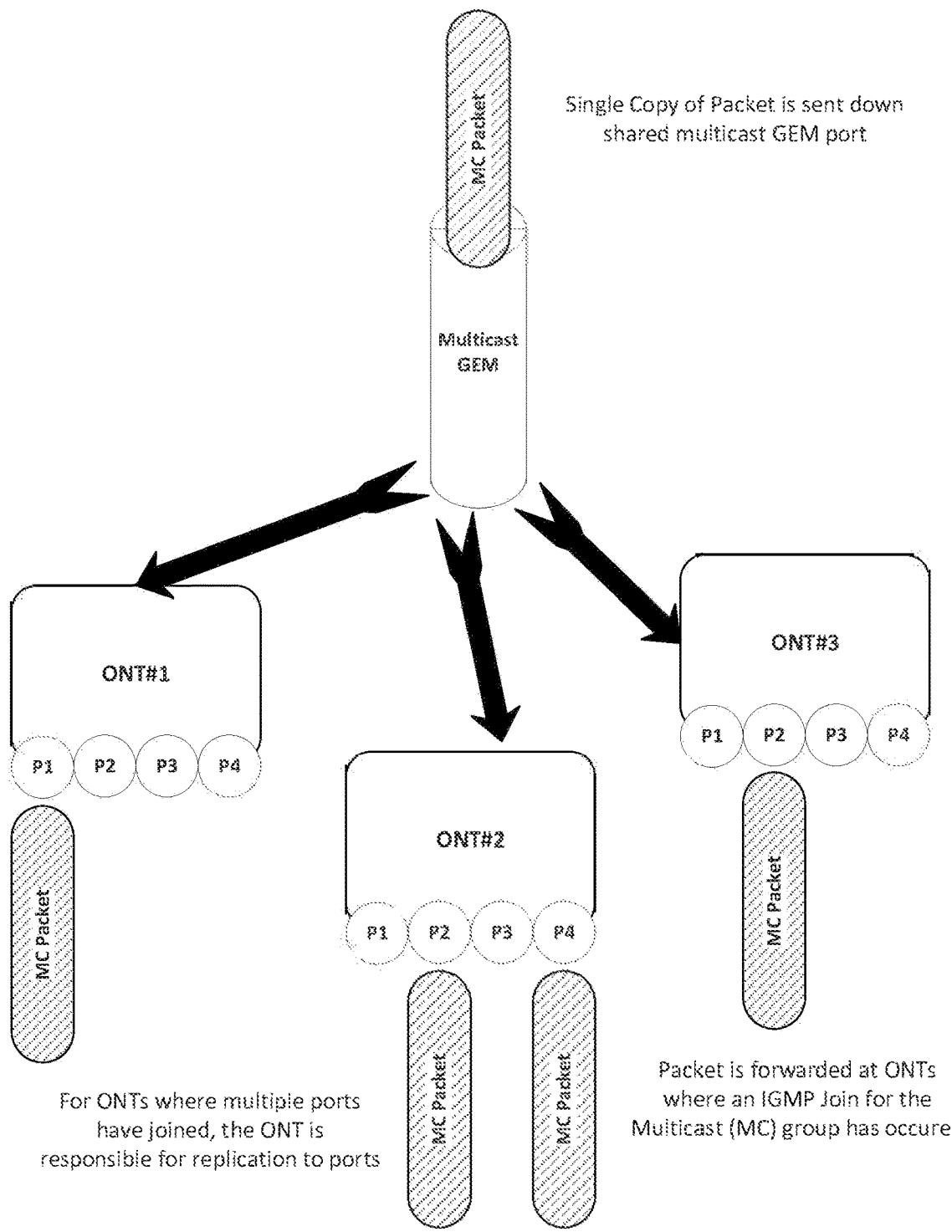
FIG. 1 is a diagram depicting traditional downstream multicast in prior art systems.
Figure 2:
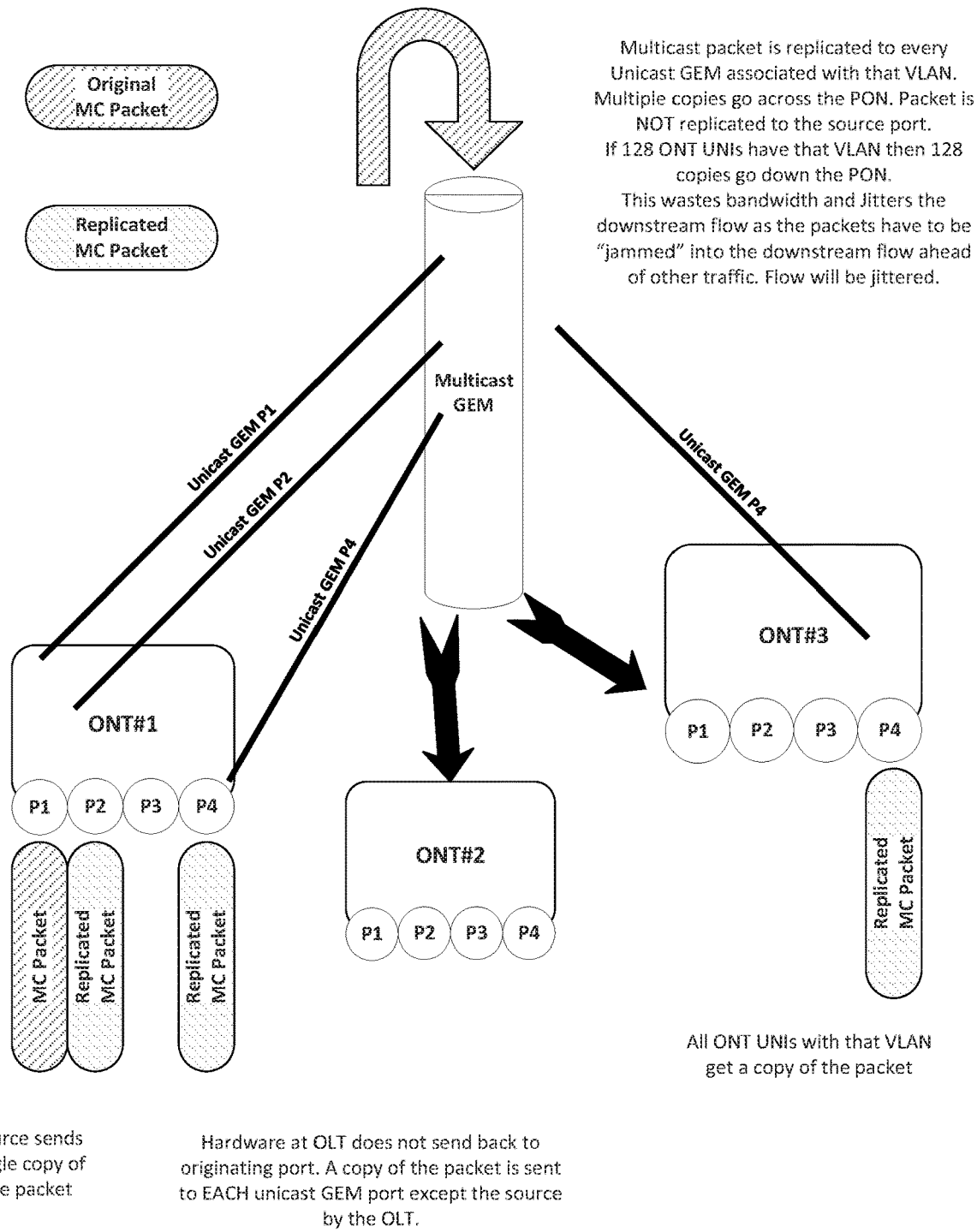
FIG. 2 is a diagram depicting the causes of inefficiency in prior art systems attempting upstream multicast using unicast GEM ports.
Figure 3:
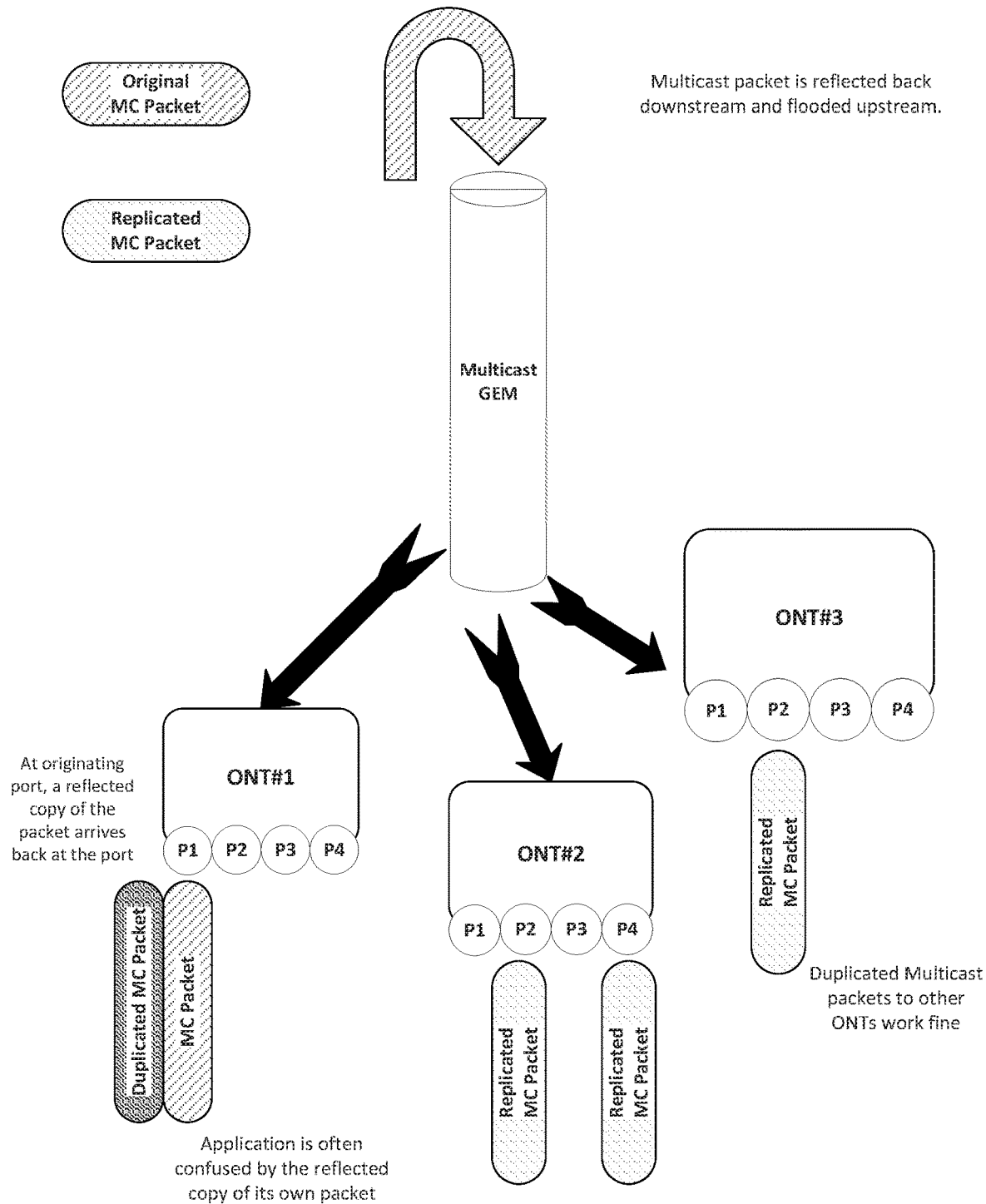
FIG. 3 is a diagram depicting the problem of reflected packets present in prior art systems utilizing a multicast GEM port.
Figure 4:
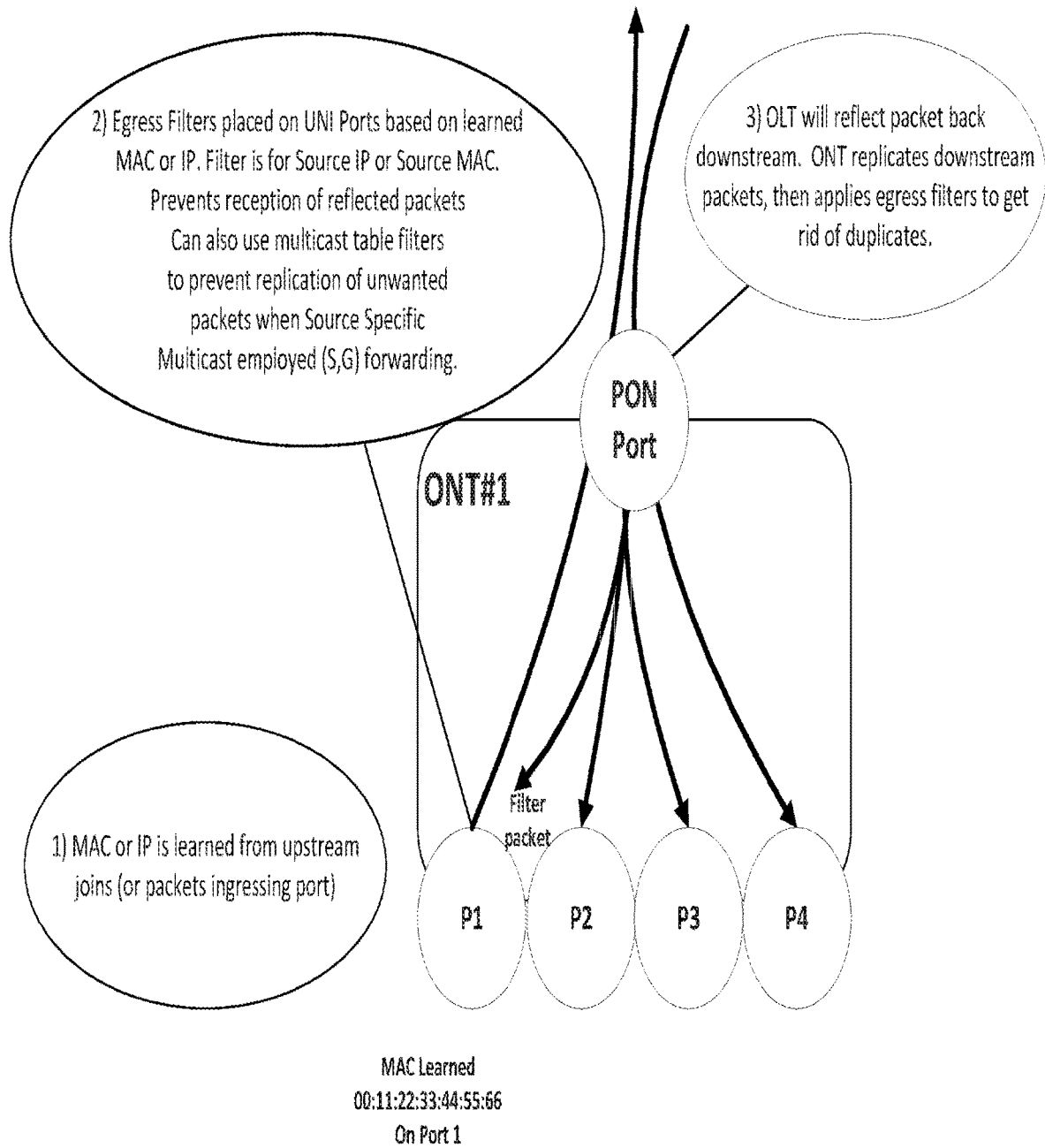
FIG. 4 is a diagram demonstrating one embodiment of the present invention that utilizes port-specific media access control (MAC) address filter.

In one embodiment, the filter is a port-specific MAC filter installed in the downstream, ONT access node interface (ANI) to UNI, direction. As depicted in FIG. 4, said filter is an egress filter on the port the upstream source MAC was learned on. The filter can alternatively be implemented to act based on upstream source IP or a combination of upstream source MAC and IP. The filter will drop reflected packets.

In another embodiment, the filter is an L3 source-specific multicast forwarding whitelist filter. A source IP is learned on the upstream source port with destination(s) being defined by groups joined by said source IP. In this embodiment, the source-specific filter allows for prevention of packet reflection to the source port by only forwarding the upstream packet to those ports where source IP was not learned. Alternatively, an L2 source-specific multicast forwarding whitelist filter may be used that instead relies on source MAC in place of source IP to prevent packet reflection.

In another embodiment, the filter is an L3 source-specific multicast forwarding blacklist filter. A source IP is learned on the upstream source port with destination(s) being defined by groups joined by said source IP. The blacklist filter is placed only on the egress of the port which the join came from. This allows for other ports to join the same group and get the traffic but also filters traffic going back to the source port.

In yet another embodiment, the filter is an L3 source-specific multicast forwarding blacklist ingress filter with flooding between UNIs. A source IP is learned on the upstream source port with destination(s) being defined by groups joined by said source IP. The blacklist filter is then placed only on the ingress of the ONT at the PON port. This will block all downstream packets from the source IP to the known group address. Although typically this would also result in denying said downstream packets to all other UNIs within the ONT, in this embodiment this problem is resolved by flooding the multicast traffic upstream to all UNIs within the ONT that have the same VLAN assigned as that of the upstream source. In other embodiments, this approach may be further optimized by flooding only those UNIs that have joined the destination group(s).

Figure 5:
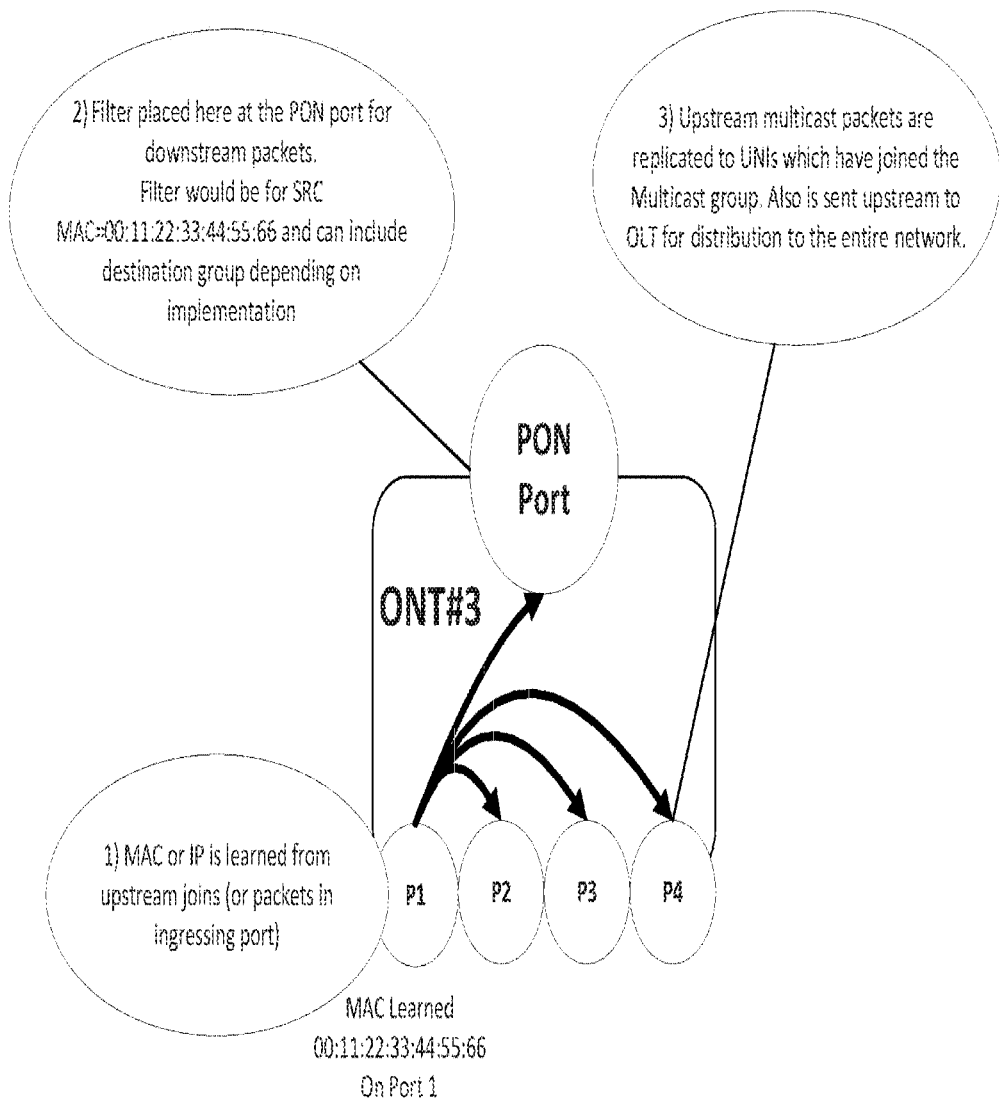
FIG. 5 is a diagram demonstrating one embodiment of the present invention that utilizes source-specific blacklist ingress filtering with flooding between UNIs.

As shown in FIG. 5, in this embodiment, with each learning event, a MAC (or IP) filter is placed on the PON port. With each aging event where the MAC (or IP) falls out of the table, the corresponding MAC (or IP) filter is removed.

Regarding the source-specific filters described above, learned events may be recorded in a table to facilitate the look up and comparison of MAC or IP data when determining whether to forward or drop upstream packet communications.

Although particular detailed embodiments of the system and method have been described herein, it should be understood that the invention is not restricted to the details of the preferred embodiment. Many changes in design, composition, and configuration are possible without departing from the spirit and scope of the instant invention.

What is claimed is:

1. A system for efficient passive optical network (PON) upstream multicast comprising:
   a computer network comprising:
      a line terminal comprising a multicast port, said multicast port configured to send an upstream multicast packet sent from a first network terminal back downstream to at least said first network terminal;
      said first network terminal comprising:
         a first network interface coupled to said first network terminal, said first network terminal being configured to receive said upstream multicast packet from said first network interface and to cause said upstream multicast packet to be communicated to said line terminal; and
         a network filter configured to regulate transmission of said upstream multicast packet, wherein said network filter is a per port multicast express filter configured to restrict communication of upstream multicast packet based on a learned source internet protocol (IP) address and a multicast group destination address, said learned source IP address corresponding to said first network interface.

2. The system of claim 1 wherein said network filter is a per port egress media access control (MAC) filter configured to prevent communication of said upstream multicast packet to a learned source MAC address, said learned source MAC address corresponding to said first network interface.

3. The system of claim 2 wherein said per port egress filter learns said learned source MAC address from an Internet Group Management Protocol (IGMP) join request.

4. The system of claim 1 wherein said network filter is a per port egress internet protocol (IP) filter configured to prevent communication of said upstream multicast packet to a learned source IP address, said learned source IP address corresponding to said first network interface.

5. The system of claim 4 wherein said per port egress IP filter learns said learned source IP address from an Internet Group Management Protocol (IGMP) join request.

6. The system of claim 1 wherein said learned source IP address is learned from an Internet Group Management Protocol (IGMP) join request.

7. The system of claim 1 wherein said network filter utilizes a multicast forwarding whitelist L2 table entry, said multicast forwarding whitelist L2 table entry being classified on a source media access control (MAC) address and a multicast group destination MAC address, said network filter being configured to communicate said upstream multicast packet to ports where said source MAC address was not learned.

8. The system of claim 6 wherein a source media access control (MAC) address and a group destination MAC address are derived from an IGMP join request.

9. The system of claim 1 wherein said network filter utilizes a multicast forwarding whitelist L3 table entry, said multicast forwarding whitelist L3 table entry being classified on a source IP address and a multicast group destination IP address, said network filter being configured to communicate said upstream multicast packet to ports where said source IP address was not learned.

10. The system of claim 1 wherein said first network terminal further comprises a second network interface, said first network terminal being configured to communicate said upstream multicast packet to said second network interface.

11. The system of claim 10 wherein said first network interface is a member of a multicast group, and wherein said second network interface is a member of said multicast group.

12. The system of claim 10 wherein said network filter is configured to drop a downstream multicast packet communicated from an access node interface (ANI) port with a learned source IP address, said learned source IP address being learned from an upstream Internet Group Management Protocol (IGMP) join request.

13. The system of claim 12 wherein said network filter utilizes a multicast forwarding blacklist L3 table entry.

14. The system of claim 10 wherein said network filter is configured to drop a downstream multicast packet communicated from an access node interface (ANI) port with a learned source media access control (MAC) address, said learned source MAC address being learned from an upstream Internet Group Management Protocol (IGMP) join request.

15. The system of claim 10 wherein said network filter is configured to drop a downstream multicast packet communicated from an access node interface (ANI) port with a learned source media access control (MAC) address, said learned source MAC address being learned from upstream packets.

16. A system for efficient passive optical network (PON) upstream multicast comprising:
a computer network comprising:
a line terminal comprising a multicast port, said multicast port configured to send an upstream multicast packet sent from a first network terminal back downstream to at least said first network terminal;
said first network terminal comprising:
a first network interface coupled to said first network terminal, said first network terminal being configured to receive said upstream multicast packet from said first network interface and to cause said upstream multicast packet to be communicated to said line terminal;
a second network interface, said first network terminal being configured to communicate said upstream multicast packet to said second network interface; and
a network filter configured to regulate transmission of said upstream multicast packet,
wherein said network filter is configured to drop a downstream multicast packet communicated from an access node interface (ANI) port with a learned source internet protocol (IP) address, said learned source IP address being learned from an upstream Internet Group Management Protocol join request.

17. A system for efficient passive optical network (PON) upstream multicast comprising:
a computer network comprising:
a line terminal comprising a multicast port, said multicast port configured to send an upstream multicast packet sent from a first network terminal back downstream to at least said first network terminal;
said first network terminal comprising:
a first network interface coupled to said first network terminal, said first network terminal being configured to receive said upstream multicast packet from said first network interface and to cause said upstream multicast packet to be communicated to said line terminal; and
a network filter configured to regulate transmission of said upstream multicast packet,
wherein said network filter utilizes a multicast forwarding whitelist L3 table entry, said multicast forwarding whitelist L3 table entry being classified on a source internet protocol (IP) address and a multicast group destination IP address, said network filter being configured to communicate said upstream multicast packet to ports where said source IP address was not learned.

* * * * *